US012573528B2

(12) United States Patent
Tung et al.

(10) Patent No.: US 12,573,528 B2
(45) Date of Patent: Mar. 10, 2026

(54) OVER-CURRENT PROTECTION DEVICE

(71) Applicant: Polytronics Technology Corp., Hsinchu (TW)

(72) Inventors: Cheng-Yu Tung, Tainan (TW); Chia-Yuan Lee, Hsinchu (TW); Hsiu-Che Yen, Taoyuan (TW); Chen-Nan Liu, Pitou Township (TW); Yung-Hsien Chang, Douliu (TW); Yao-Te Chang, Linnei Township (TW); Fu-Hua Chu, Taipei (TW); Takashi Hasunuma, Narita (JP)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 418 days.

(21) Appl. No.: 18/311,723

(22) Filed: May 3, 2023

(65) Prior Publication Data

US 2024/0177893 A1 May 30, 2024

(30) Foreign Application Priority Data

Nov. 28, 2022 (TW) ................................. 111145474

(51) Int. Cl.
*H01C 7/02* (2006.01)
*H01C 1/14* (2006.01)

(52) U.S. Cl.
CPC ........... *H01C 7/027* (2013.01); *H01C 1/1406* (2013.01)

(58) Field of Classification Search
CPC .............................. H01C 7/027; H01C 1/1406
See application file for complete search history.

(56) References Cited

U.S. PATENT DOCUMENTS 5,801,612 A * 9/1998 Chandler ............ H01M 50/581 338/22 R
6,512,446 B2 * 1/2003 Wang ..................... H01C 7/027 252/511
8,496,854 B2 * 7/2013 Mercx .................... H01C 7/027 252/502
8,536,973 B2 * 9/2013 Lo .................... H01C 17/06586 338/22 R
9,041,507 B2 * 5/2015 Wang ..................... H01C 7/027 338/13
9,431,822 B1 * 8/2016 Chen .................. H01C 17/0652
(Continued)

FOREIGN PATENT DOCUMENTS

CN 106317544 A 1/2017
CN 206401113 U 8/2017

*Primary Examiner* — Kyung S Lee
(74) *Attorney, Agent, or Firm* — MUNCY, GEISSLER, OLDS & LOWE, P.C.

(57) ABSTRACT

An over-current protection device includes a heat-sensitive layer and an electrode layer. The electrode layer includes a top metal layer and a bottom metal layer, and the heat-sensitive layer attached therebetween. The heat-sensitive layer exhibits a positive temperature coefficient (PTC) characteristic and includes a polymer matrix and a conductive filler. The polymer matrix includes a polyolefin-based homopolymer and a polyolefin-based copolymer. The polyolefin-based homopolymer has a first coefficient of thermal expansion (CTE), and the polyolefin-based copolymer has a second CTE lower than the first CTE. The polyolefin-based homopolymer and the polyolefin-based copolymer together form an interpenetrating polymer network (IPN).

20 Claims, 3 Drawing Sheets

(56) References Cited

U.S. PATENT DOCUMENTS

| | | | | |
|---|---|---|---|---|
| 10,858,506 | B2 * | 12/2020 | Ku | C08L 23/0869 |
| 10,902,980 | B1 * | 1/2021 | Dong | H01C 1/1406 |
| 11,037,708 | B2 * | 6/2021 | Chen | H01H 85/06 |
| 11,626,220 | B2 * | 4/2023 | Li | H01C 1/028 |
| | | | | 338/22 R |

* cited by examiner

OVER-CURRENT PROTECTION DEVICE

BACKGROUND OF THE INVENTION

(1) Field of the Invention

The present application relates to an over-current protection device, and more specifically, to an over-current protection device having a thin size and excellent thermal stability.

(2) Description of the Related Art

Because the electrical resistance of conductive composite materials having a positive temperature coefficient (PTC) characteristic is very sensitive to temperature variation, they can be used as the materials for current sensing devices and have been widely applied to over-current protection devices or circuit devices. More specifically, the electrical resistance of the PTC conductive composite material remains extremely low at normal temperatures, so that the circuit or battery cell can operate normally. However, when an over-current or an over-temperature situation occurs in the circuit or cell, the electrical resistance will instantaneously increase to a high electrical resistance state (e.g., at least above $10^4\Omega$), which is the so-called "trip". Therefore, the over-current will be eliminated so as to protect the cell or the circuit device.

The basic structure of the over-current protection device consists of a PTC material layer with two electrodes bonded to two opposite sides of the PTC material layer. The PTC material layer includes a matrix and a conductive filler. The matrix generally consists of one or more polymers, and the first conductive filler is uniformly dispersed in the matrix and is used as an electrically conductive path. It is understood that the over-current protection device may go through several processes, such as molding or welding, under high temperature environment before its practical use; and after finishing the processes, the over-current protection device still experiences high temperature in a trip event during operation. However, gaps or even cracks are easily formed in the PTC material layer in an environment alternating between high temperature and low temperature. The gaps or cracks damage the integrity of the entire structure, and further increase the electrical resistance of the device, thereby compromising the stability of electrical resistance of the over-current protection device. In other words, electrical characteristics of such crack-containing or high-electrical resistance over-current protection device are different from the original ones, and are not optimal for practical use.

Additionally, electronic apparatuses are being made smaller and smaller as time goes on. Therefore, it is required to extremely restrict the sizes or thicknesses of active and passive devices. However, if the top-view area of the PTC material layer is decreased, the electrical resistance of the device will be increased, and the voltage that the device can endure at most is lowered. Thus, the over-current protection device cannot withstand large current and high power. In addition, if the thickness of the PTC material layer is reduced, the voltage endurance capability of the device will be reduced at the same time. Apparently, small-sized over-current protection devices are easily burnt out in real applications.

Accordingly, there is a need to improve the thickness and thermal stability of the over-current protection device.

SUMMARY OF THE INVENTION

The present invention provides a thermally stable and ultra-thin over-current protection device. The over-current protection device has a heat-sensitive layer, the electrical resistance of which increases in response to high temperature, and therefore the overcurrent can be cut off to protect the electronic apparatuses. The present invention introduces a polyolefin-based copolymer into a polymer matrix of the heat-sensitive layer, thereby preventing the gaps or cracks from happening in the heat-sensitive layer under high temperature. Moreover, the heat-sensitive layer may further include a polyolefin-based homopolymer, which is blended with the polyolefin-based copolymer to form an interpenetrating polymer network (IPN). The structure of IPN decreases phase separation between the polyolefin-based copolymer and the polyolefin-based homopolymer, and lowers coefficient of thermal expansion (CTE) of the heat-sensitive layer. In this way, the structure of materials in the heat-sensitive layer can be kept as close as possible to its original state even under high temperature, and therefore the structural integrity is much better than ever. The over-current protection device can be made thinner, and can operate at a higher applied voltage without burnout.

In accordance with an aspect of the present invention, an over-current protection device includes a heat-sensitive layer and an electrode layer. The heat-sensitive layer has a top surface and a bottom surface. The electrode layer includes a top metal layer and a bottom metal layer. The top metal layer and the bottom metal layer are attached to the top surface and the bottom surface of the heat-sensitive layer, respectively. In addition, the heat-sensitive layer exhibits a positive temperature coefficient (PTC) characteristic and includes a polymer matrix and a conductive filler. The polymer matrix includes a polyolefin-based homopolymer and a polyolefin-based copolymer. The polyolefin-based homopolymer has a first coefficient of thermal expansion (CTE), and the polyolefin-based copolymer has a second CTE. The second CTE is lower than the first CTE, and the polyolefin-based homopolymer and the polyolefin-based copolymer together form an interpenetrating polymer network (IPN). The conductive filler is dispersed in the polymer matrix, thereby forming an electrically conductive path in the heat-sensitive layer.

In an embodiment, the polyolefin-based homopolymer is high-density polyethylene, and the polyolefin-based copolymer is selected from the group consisting of ethylene-butene copolymer, ethylene-pentene copolymer, ethylene-hexene copolymer, ethylene-heptene copolymer, and ethylene-octene copolymer.

In an embodiment, the polyolefin-based copolymer is a random copolymer, a graft copolymer, or combination thereof according to an arrangement of monomer units.

In an embodiment, the polyolefin-based copolymer is ethylene-butene copolymer, wherein the total volume of the heat-sensitive layer is calculated as 100%, and the polymer matrix accounts for 47% to 52%.

In an embodiment, a volume-to-volume ratio of the polyolefin-based homopolymer to the polyolefin-based copolymer is 1:4 to 4:1.

In an embodiment, a CTE of the heat-sensitive layer ranges from 42 ppm/° C. to 60 ppm/° C. between 20° C. and 100° C.

In an embodiment, a CTE of the heat-sensitive layer ranges from 1500 ppm/° C. to 2600 ppm/° C. between 100° C. and 120° C.

In an embodiment, a CTE of the heat-sensitive layer ranges from 180 ppm/° C. to 240 ppm/° C. between 150° C. and 175° C.

In an embodiment, the conductive filler consists of carbon black, wherein the total volume of the heat-sensitive layer is calculated as 100%, and the conductive filler accounts for 33% to 39%.

In an embodiment, the heat-sensitive layer further includes a flame retardant. The flame retardant is selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide, and any combination thereof.

In an embodiment, the heat-sensitive layer has a thickness ranging from 0.09 mm to 0.13 mm.

In an embodiment, the over-current protection device has a first resistance-jump ratio ranging from 2.3 to 2.7, wherein the over-current protection device has a first electrical resistance in an initial state at room temperature before any trip event, and the over-current protection device has a second electrical resistance when cooled back to room temperature after baking at 175° C. for 4 hours, wherein a value by dividing the second electrical resistance by the first electrical resistance is the first resistance-jump ratio.

In an embodiment, the first resistance-jump ratio ranges from 2.3 to 2.4.

In an embodiment, the over-current protection device has a second resistance-jump ratio ranging from 3 to 5, wherein the over-current protection device has a third electrical resistance when cooled back to room temperature after being applied at 20V/10 A for 500 cycles, and a value by dividing the third electrical resistance by the first electrical resistance is the second resistance-jump ratio.

In an embodiment, the second resistance-jump ratio ranges from 3.3 to 3.4.

In an embodiment, the over-current protection device has a voltage-endurance value of at least 30V, and the over-current protection device is not burnt out after being applied at 30V/10 A for 500 cycles.

In an embodiment, a standard deviation of the third electrical resistance ranges from 3.3 to 8.6.

In an embodiment, the standard deviation of the third electrical resistance ranges from 3.3 to 3.4.

In an embodiment, the heat-sensitive layer has a thickness ranging from 0.9 mm to 0.94 mm.

In an embodiment, the over-current protection device has a top-view area ranging from 64 $mm^2$ to 74 $mm^2$.

In an embodiment, the over-current protection device has a third resistance-jump ratio ranging from 1.2 to 1.5, wherein the over-current protection device has a first electrical resistance in an initial state at room temperature before any trip event, and the over-current protection device has a fourth electrical resistance when cooled back to room temperature after being applied at 16V/50 A for 3 minutes, wherein a value by dividing the fourth electrical resistance by the first electrical resistance is the third resistance-jump ratio.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
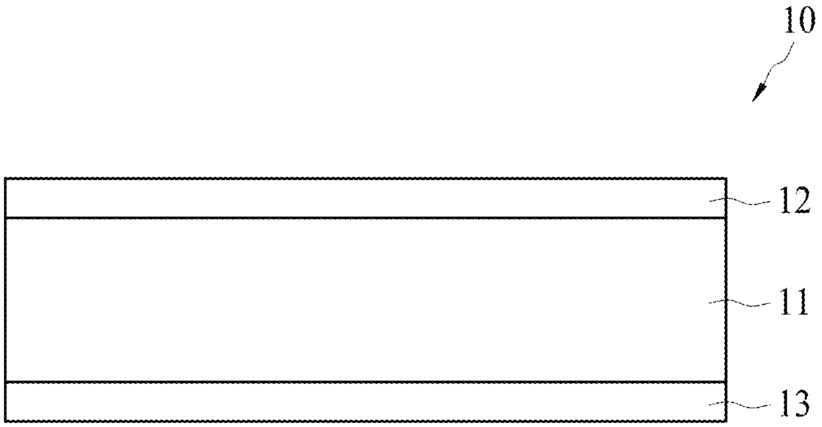
FIG. 1 shows a cross-sectional view of an over-current protection device in accordance with an embodiment of the present invention.

Please refer to FIG. 1. FIG. 1 shows one basic aspect of an over-current protection device 10 of the present invention in cross-sectional view. The over-current protection device 10 includes a heat-sensitive layer 11, and includes an electrode layer having a top metal layer 12 and a bottom metal layer 13. The heat-sensitive layer 11 has a top surface and a bottom surface, and the top metal layer 12 and the bottom metal layer 13 are attached to the top surface and the bottom surface of the heat-sensitive layer 11, respectively. Therefore, the heat-sensitive layer 11 is laminated between the metal layers of the electrode layer. In an embodiment, the top metal layer 12 and the bottom metal layer 13 may be composed of the nickel-plated copper foils or other conductive metals. In addition, the heat-sensitive layer 11 exhibits a positive temperature coefficient (PTC) characteristic and includes a polymer matrix and a conductive filler. The polymer matrix includes a polyolefin-based homopolymer and a polyolefin-based copolymer. The polyolefin-based homopolymer has a first coefficient of thermal expansion (CTE), and the polyolefin-based copolymer has a second CTE. The second CTE is lower than the first CTE. The conductive filler is dispersed in the polymer matrix, thereby forming an electrically conductive path in the heat-sensitive layer 11.

In the heat-sensitive layer 11, the CTE of the polyolefin-based copolymer (i.e., second CTE) is lower than the CTE of the polyolefin-based homopolymer (i.e., first CTE); and the polyolefin-based homopolymer and the polyolefin-based copolymer together form the structure of IPN, by which the polyolefin-based copolymer having lower CTE is stabilized and further decreases the entire CTE of the heat-sensitive layer 11. More specifically, a polymer matrix made of the polyolefin-based homopolymer leads to a higher CTE of the heat-sensitive layer 11 when compared with the polymer matrix having the polyolefin-based homopolymer and the polyolefin-based copolymer. A polymer matrix made of the polyolefin-based copolymer may be helpful in decreasing CTE, but still leads to a higher CTE of the heat-sensitive layer 11 when compared with the polymer matrix having the polyolefin-based homopolymer and the polyolefin-based copolymer. In other words, the combination of the polyolefin-based homopolymer and the polyolefin-based copolymer is better than either alone in the polymer matrix, and can further lower down CTE of the heat-sensitive layer 11. It is understood that the over-current protection device 10 experiences high temperature in the subsequent processes or during the trip event, and may have gaps or even cracks under the high temperature environment if it suffers from severe thermal expansion. Accordingly, the thermal stability of over-current protection device 10 can be improved by properly controlling CTE of the heat-sensitive layer 11 and forming IPN to stabilize the entire structure thereof.

In the present invention, at least one monomer unit of the polyolefin-based copolymer is the same as the monomer unit of the polyolefin-based homopolymer. For example, in one case, the polyolefin-based homopolymer is high-density polyethylene, at least one monomer unit of the polyolefin-based copolymer is ethylene; and the polyolefin-based copolymer may be selected from the group consisting of ethylene-butene copolymer, ethylene-pentene copolymer, ethylene-hexene copolymer, ethylene-heptene copolymer, ethylene-octene copolymer, and any combination thereof. Moreover, in order to obtain better electrical performance, the polyolefin-based copolymer is neither an alternative copolymer nor a block copolymer according to an arrangement of its monomer units. In the present invention, the polyolefin-based copolymer is a random copolymer, a graft copolymer, or combination thereof according to an arrangement of monomer units. It is noted that the issue of microphase separation may exist in either the random copolymer or the graft copolymer. Taking the ethylene-butene copolymer as an example, some ethylene monomers are likely to aggregate in one region of the copolymer and some butene monomers are likely to aggregate in another region of the copolymer, and therefore there is incompatibility between such two kinds of monomer units in the copolymer, that is, the microphase separation exists. However, the present invention introduces the structure of IPN formed of the polyolefin-based homopolymer and the polyolefin-based copolymer, and it can restrict rotation or movement of polymer chains, thereby reducing microphase separation in the copolymer. In order to form an excellent network structure of IPN, the polyolefin-based copolymer is preferably the graft copolymer according to the arrangement of its monomer units, and it is much better if the monomer units are randomly ordered on both the main chain and side chain of the graft copolymer. Because the graft copolymer has many side chains connected to each main chain, these side chains make formation of a network easier. Then, if neither the main chain nor the side chain is composed of single kind of monomer (e.g., the main chain is polyethylene and the side chain is polybutene), the microphase separation is further reduced. It is noted that, in the heat-sensitive layer 11, the present invention excludes use of polypropene homopolymer and ethylene-propene copolymer. Either polypropene homopolymer or ethylene-propene copolymer has poor crystallinity which leads to poor resistance repeatability in practical use, and electrical performance (e.g., voltage endurance capability and electrical resistance stability) is poor when either one of them is used in the over-current protection device 10. Besides, ethylene-propene copolymer has an abundance of side chains formed of propene monomers, and these side chains formed of propene monomers are too short to be favorable for the formation of the network structure.

In order to trigger the trip action of the over-current protection device 10, the polymer matrix preferably accounts for at least half the heat-sensitive layer 11 by volume, such as 47% to 52% by volume of the heat-sensitive layer 11. According to the percentage of the polymer matrix described above, a volume-to-volume ratio of the polyolefin-based homopolymer to the polyolefin-based copolymer is further controlled to be 1:4 to 4:1, by which the heat-sensitive layer 11 can have a lower CTE. For example, the total volume of the heat-sensitive layer 11 is calculated as 100%; and the volume percentage of the polyolefin-based homopolymer may increase from 10% to 40%, and the volume percentage of the polyolefin-based copolymer may correspondingly decrease from 40% to 10%. In one embodiment, the polyolefin-based homopolymer accounts for about 40% by volume, and the polyolefin-based copolymer accounts for about 10% by volume. In another embodiment, the polyolefin-based homopolymer accounts for about 30% by volume, and the polyolefin-based copolymer accounts for about 20% by volume. In other words, if the volume-to-volume ratio of the polyolefin-based homopolymer to the polyolefin-based copolymer is 1:4 to 4:1 and the combined volume percentage of them ranges from 47% to 52%, the heat-sensitive layer 11 can have a lower CTE. More specifically, a CTE of the heat-sensitive layer 11 ranges from 42 ppm/° C. to 60 ppm/° C. (e.g., 42.1 ppm/° C., 46.8 ppm/° C., 49.97 ppm/° C., 57.2 ppm/° C., or 59.8 ppm/° C.) between 20° C. and 100° C.; a CTE of the heat-sensitive layer 11 ranges from 1500 ppm/° C. to 2600 ppm/° C. (e.g., 1511 ppm/° C., 1845 ppm/° C., 2018 ppm/° C., 2533 ppm/° C., or 2598 ppm/° C.) between 100° C. and 120° C.; and a CTE of the heat-sensitive layer 11 ranges from 180 ppm/° C. to 240 ppm/° C. (e.g., 186 ppm/° C., 197.5 ppm/° C., 208 ppm/° C., 231.8 ppm/° C., or 239.7 ppm/° C.) between 150° C. and 175° C. In a preferred embodiment, the volume-to-volume ratio of the polyolefin-based homopolymer to the polyolefin-based copolymer is 1:4 to 4:1; the CTE of the heat-sensitive layer 11 ranges from 42 ppm/° C. to 50 ppm/° C. between 20° C. and 100° C.; the CTE of the heat-sensitive layer 11 ranges from 1500 ppm/° C. to 2020 ppm/° C. between 100° C. and 120° C.; and the CTE of the heat-sensitive layer 11 ranges from 180 ppm/° C. to 210 ppm/° C. between 150° C. and 175° C. In the best embodiment, the volume-to-volume ratio of the polyolefin-based homopolymer to the polyolefin-based copolymer is 1:4 to 4:1; the CTE of the heat-sensitive layer 11 ranges from 48 ppm/° C. to 50 ppm/° C. between 20° C. and 100° C.; the CTE of the heat-sensitive layer 11 ranges from 1500 ppm/° C. to 1520 ppm/° C. between 100° C. and 120° C.; and the CTE of the heat-sensitive layer 11 ranges from 180 ppm/° C. to 192 ppm/° C. between 150° C. and 175° C.

As for the conductive filler, the amount of it is lower than the polymer matrix in a way such that the heat-sensitive layer 11 still maintains excellent electrical conductivity before the trip event. For example, the total volume of the heat-sensitive layer 11 is calculated as 100%, and the conductive filler accounts for 33% to 39%. In an embodiment, in order to increase the voltage endurance and the stability of other electrical characteristics of the device 10, the conductive filler may merely consist of carbon black. In another embodiment, in order to have a better electrical conductivity (i.e., to obtain an over-current protection device 10 with low electrical resistivity), the conductive filler may be conductive ceramic material, metal material, metal carbide, metal compound, or any combination thereof.

Considering the enhancement of flame resistance of the over-current protection device 10, the heat-sensitive layer 11 may further include a flame retardant. The flame retardant is selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide, and any combination thereof. In an embodiment, the flame retardant is magnesium hydroxide; and the total volume of the heat-sensitive layer 11 is calculated as 100%, and magnesium hydroxide accounts for 12% to 13% by volume. If the polymer matrix includes a fluoropolymer, magnesium hydroxide can act as a buffer for acid-base neutralization besides its application in the flame retardancy. For example, hydrofluoric acid (HF) is generated due to degradation of the fluoropolymer under high temperature, and magnesium hydroxide may react with hydrofluoric acid by neutralization reaction in the meantime, thereby preventing device corrosion and other hazards caused by hydrofluoric acid.

It is noted that, considering the voltage endurance of the over-current protection device, the conventional over-current protection device, whose polymer matrix only contains the polyolefin-based homopolymer, generally has a thickness of about 0.3 mm. However, using the concept of IPN and thermal stability described above, the present invention may reduce the thickness of the over-current protection device 10 down to 0.16 mm to 0.2 mm. For example, both the top metal layer 12 and the bottom metal layer 13 of the over-current protection device 10 are copper foils, and each of them has a thickness of 1 ounce (oz). Therefore, the heat-sensitive layer 11 may have a thickness ranging from 0.09 mm to 0.13 mm to make the entire thickness equal to 0.16 mm (i.e., 0.035 mm×2+0.09 mm) to 0.2 mm (i.e., 0.035 mm×2+0.13 mm). It is noted that the present invention decreases the thickness while enhancing the voltage endurance capability of the over-current protection device 10. Consequently, in a cycle life test, the over-current protection device 10 can endure an applied power of 30V/10 A for 500 cycles, but the conventional over-current protection device is burnt out under the same applied power.

Besides the voltage endurance capability described above, the over-current protection device 10 of the present invention may have other improved electrical characteristics (e.g., lower resistance-jump ratio and lower standard deviation of the electrical resistance) because of its thermal stability. See below for more details. It is understood that the over-current protection device 10 goes through several processes under high temperature environment, and such high temperature triggers the trip action of the over-current protection device 10 to make it reach to a high electrical resistance state. After the processes, the over-current protection device 10 gradually cools down and returns to a low electrical resistance state under room temperature. However, the over-current protection device 10 has an electrical resistance different from its initial electrical resistance even though it returns to the low electrical resistance state after tripping. The difference between above two values of electrical resistance (i.e., resistance-jump ratio) can be used to assess the stability of electrical resistance of the over-current protection device 10. Accordingly, in a four-hour baking treatment, the over-current protection device 10 has a first resistance-jump ratio ranging from 2.3 to 2.7. More specifically, the over-current protection device 10 has a first electrical resistance in an initial state at room temperature before any trip event. After baking at 175° C. for 4 hours, the over-current protection device 10 has a second electrical resistance when cooled back to room temperature. A value by dividing the second electrical resistance by the first electrical resistance is the first resistance-jump ratio. In a preferred embodiment, the first resistance-jump ratio ranges from 2.3 to 2.4.

In addition, the applied power used in the cycle life test also triggers the trip action of the over-current protection device 10. A second resistance-jump ratio of the over-current protection device 10 of the present invention can be calculated from the cycle life test and is in the range from 3 to 5. More specifically, one cycle of the cycle life test includes applying voltage/current at 20V/10 A for 10 seconds and turning it off for 60 seconds (i.e., on: 10 seconds; off: 60 seconds), and 500 cycles are performed on the over-current protection device 10. After being applied at 20V/10 A for 500 cycles, the over-current protection device 10 has a third electrical resistance when cooled back to room temperature. A value by dividing the third electrical resistance by the first electrical resistance is the second resistance-jump ratio. In a preferred embodiment, the second resistance-jump ratio ranges from 3.3 to 3.4. It is noted that, in the cycle life test, a standard deviation of the third electrical resistance ranges from 3.3 to 8.6. For example, fifteen samples of the over-current protection device 10 are picked for the cycle life test and tested under the same condition (i.e., 20V/10 A for 500 cycles), and the statistical dispersion of the third electrical resistances of these fifteen samples is calculated to give a value, which ranges from 3.3 to 8.6. In contrast, a standard deviation of the third electrical resistance of the conventional over-current protection device is higher than 10. It means that the electrical resistances of the over-current protection device 10 of the present invention are more consistent and the resistance change and/or variation will be much smaller than the conventional over-current protection device during mass production. In a preferred embodiment, the standard deviation of the third electrical resistance of the over-current protection device 10 of the present invention ranges from 3.3 to 3.4, which is about three times less than that of the conventional one.

Figure 2:
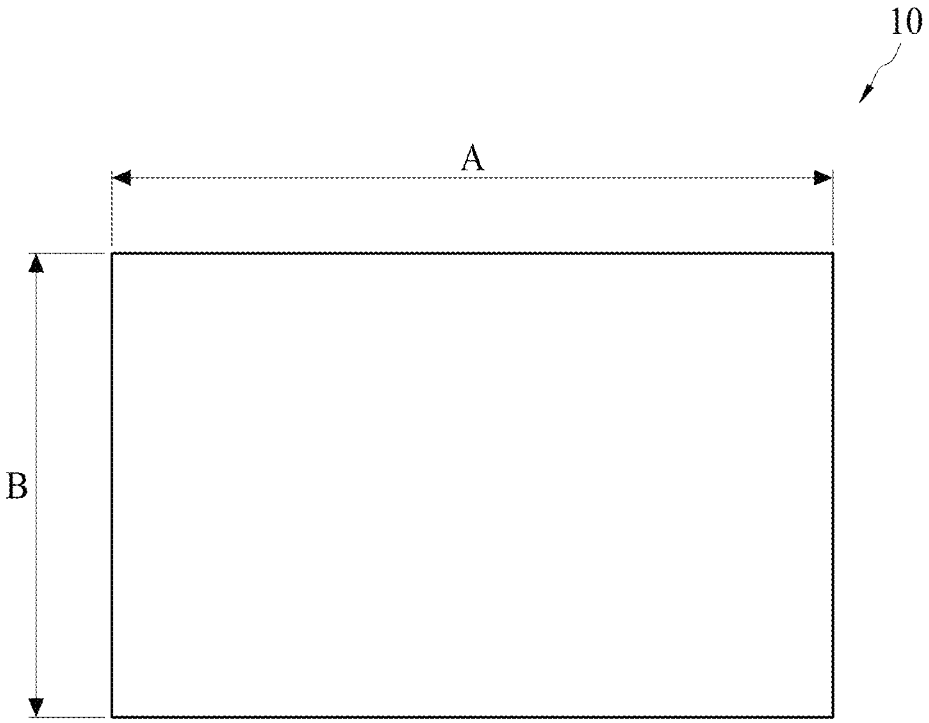
FIG. 2 shows the top view of the over-current protection device shown in FIG. 1.

Please refer to FIG. 2, which shows the top view of the over-current protection device 10 in FIG. 1. The over-current protection device 10 has a length A and a width B, and the top-view area "A×B" of the over-current protection device 10 is substantially equivalent to the top-view area of the heat-sensitive layer 11. The heat-sensitive layer 11 may have a top-view area ranging from 4 $mm^2$ to 72 $mm^2$ based on different products having different sizes. For example, the top-view area "A×B" may be 2×2 $mm^2$, 5×5 $mm^2$, 5.1×6.1 $mm^2$, 5×7 $mm^2$, 7.62×7.62 $mm^2$, 8.2×7.15 $mm^2$, 7.3×9.5 $mm^2$, or 7.62×9.35 $mm^2$. In addition, the heat-sensitive layer 11 can be thickened to the needed thickness (e.g., 0.9 mm to 0.94 mm) depending on the device specification requirements. For example, in order to match a workpiece-holding device (e.g., fixture) in the car, the over-current protection device 10 cannot be reduced and hence has a larger size. In an embodiment, the over-current protection device 10 has the top-view area ranging from 64 $mm^2$ to 74 $mm^2$, and the thickness of the heat-sensitive layer 11 ranges 0.9 mm to 0.94 mm. After tripping, the resistance of the aforementioned large over-current protection device 10 can be measured and it has a third resistance-jump ratio ranging from 1.2 to 1.5. More specifically, the over-current protection device 10 has a first electrical resistance in an initial state at room temperature before any trip event. After being applied at 16V/50 A for 3 minutes, the over-current protection device 10 has a fourth electrical resistance when cooled back to room temperature. A value by dividing the fourth electrical resistance by the first electrical resistance is the third resistance-jump ratio. From the above, the heat-sensitive layer 11 of the present invention can be adjusted to be either thinner or thicker, depending on different requirements, and still has a great resistance stability.

As described above, the present invention improves the electrical resistance characteristics of the over-current protection device 10 under high temperature. It could be verified according to the experimental data in Table 1 to Table 6 as shown below.

TABLE 1

| Volume percentage (vol %) and thickness (mm) of the heat-sensitive layer 11. | | | | | |
|---|---|---|---|---|---|
| Group | HDPE | EBM | $Mg(OH)_2$ | CB | thickness |
| E1 | 38.0 | 12.6 | 12.9 | 36.5 | 0.099 |
| E2 | 0 | 50.6 | 12.9 | 36.5 | 0.099 |
| E3 | 12.6 | 38.0 | 12.9 | 36.5 | 0.099 |
| C1 | 50.6 | 0 | 12.9 | 36.5 | 0.230 |

TABLE 2

| Crystallinity of the polymer matrix. | | |
|---|---|---|
| Group | Crystallinity | Non-crystallinity |
| E1 | 74.92% | 25.08% |
| E2 | 74.36% | 25.64% |
| E3 | 74.54% | 25.46% |
| C1 | 75.10% | 24.90% |

Table 1 shows the composition to form the heat-sensitive layer 11 by volume percentages in accordance with the embodiments (E1-E3) of the present disclosure and the comparative example (C1). The first column in Table 1 shows test groups E1-C1 from top to bottom. The first row in Table 1 shows various materials used for the heat-sensitive layer 11 from left to right, that is, high-density polyethylene (HDPE), ethylene-butene copolymer (EBM), magnesium hydroxide ($Mg(OH)_2$), and carbon black (CB). High-density polyethylene and/or ethylene-butene copolymer together form the polymer matrix of the heat-sensitive layer 11. Magnesium hydroxide acts as a flame retardant and increases the flame retardancy of the over-current protection device 10. Carbon black acts as the conductive filler which forms the electrically conductive path of the over-current protection device 10 under the non-trip state. Additionally, it is much better to reduce the thickness of the heat-sensitive layer 11 as the electronic apparatuses are being made smaller, and therefore the thickness of the heat-sensitive layer 11 in the embodiments E1 to E3 is 0.099 mm (about 3.9 mil) and the thickness of the heat-sensitive layer 11 in the comparative example C1 is 0.23 mm (about 9 mil). It can be well observed that the present invention is made thinner while ensuring excellent electrical characteristics. Besides, the conventional device prefers to use high-density polyethylene as the polymer matrix because of its high crystallinity. The present invention shows that the combination of high-density polyethylene and ethylene-butene copolymer still remains high crystallinity. As shown in Table 2, the polymer matrix of the comparative example C1 consists of high-density polyethylene, and its crystallinity is 75.10% and non-crystallinity is 24.90%. As for the embodiments E1 to E3, the polymer matrix includes both high-density polyethylene and ethylene-butene copolymer, and its crystallinity ranges from 74% to 75% and non-crystallinity ranges from 25% to 26%. Such range of crystallinity of the embodiments E1 to E3 is similar to that of the comparative example C1. It is understood that a crystalline region in the polymer is an ordered region, and a non-crystalline region in the polymer is an amorphous region. The ordered crystalline region has an ordered packing of the polymer and is favorable to the stability of the entire structure of the over-current protection device 10, and the non-crystalline region has the contrary effect.

The manufacturing process of the embodiments E1 to E3 and the comparative example C1 is described below. According to the composition shown in Table 1, materials are formulated and put into HAAKE twin screw blender for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 kg/cm$^2$. The sheet is then cut into pieces of about 20 cm×20 cm, and two nickel-plated copper foils are laminated to two sides of the sheet with the hot press machine at a temperature of 210° C. and a pressure of 150 kg/cm$^2$, by which a three-layered structure is formed. Then, the sheet with the nickel-plated copper foils is punched into PTC chips, each of which is the over-current protection device of the present invention. Each sample of the over-current protection device has the length of 2 mm and the width of 2 mm (i.e., top-view area is 4 mm$^2$). Then, the PTC chips of the embodiments E1 to E3 and comparative example are subjected to electron beam irradiation of 150 kGy (irradiation dose can be adjusted depending on the requirement). After irradiation, the following measurements are performed by taking fifteen PTC chips as samples to be tested for each of the groups.

As described above, the over-current protection device experiences high temperature in the manufacturing process, subsequent processes or during the operation. Under the high temperature, the degree of thermal expansion of the heat-sensitive layer 11 affects the integrity of the entire structure. Accordingly, coefficient of thermal expansion (CTE) of the heat-sensitive layer 11 in each group is measured at different temperature ranges, and the data is shown in Table 3.

TABLE 3

| Coefficient of thermal expansion (ppm/° C.). | | | |
|---|---|---|---|
| Group | 20° C. to 100° C. | 100° C. to 120° C. | 150° C. to 175° C. |
| E1 | 49.97 | 1511.00 | 186.00 |
| E2 | 57.20 | 2533.00 | 231.80 |
| E3 | 42.10 | 2018.00 | 208.00 |
| C1 | 191.85 | 3971.00 | 350.19 |

As shown in Table 3, the CTEs of the embodiments E1 to E3 range from 42 ppm/° C. to 60 ppm/° C. between 20° C. and 100° C.; range from 1500 ppm/° C. to 2600 ppm/° C. between 100° C. and 120° C.; and range from 180 ppm/° C. to 240 ppm/° C. between 150° C. and 175° C. In contrast, in the above three temperature ranges, the CTEs of the comparative example C1 are 191.85 ppm/° C., 3971 ppm/° C., and 350.19 ppm/° C., respectively. The CTE of ethylene-butene copolymer is lower than the CTE of high-density polyethylene. As a result, the CTEs of the embodiments E1 to E3 are much lower than that of the comparative example C1. It is noted that the much lower CTE can be achieved if the polymer matrix includes both ethylene-butene copolymer and high-density polyethylene, such as the embodiment E1 and the embodiment E3. That is, the CTE of the heat-sensitive layer 11 is lowered if the polymer matrix is made of ethylene-butene copolymer with low CTE (i.e., the embodiment E2); and the CTE of the heat-sensitive layer 11 can be further lowered if the polymer matrix includes both ethylene-butene copolymer and high-density polyethylene (i.e., the embodiments E1 and E3). From the above, thermal expansion of the heat-sensitive layer 11 of the present invention is less severe and the integrity of the entire structure of the over-current protection device 10 is not compromised when it encounters a huge temperature change.

In order to simulate different environmental temperatures, two tests of thermal stability (referred to as "thermal stability test 1" and "thermal stability test 2" hereinafter) are conducted, and the stability of electrical resistance can be observed after thermal treatment, as shown in Table 4 and Table 5. Thermal stability test 1 is carried out by performing a reflow treatment on the over-current protection device, and changes in electrical resistance are observed. Thermal stability test 2 is carried out by performing a baking treatment on the over-current protection device to simulate the molding process, and changes in electrical resistance are observed.

TABLE 4

Thermal stability test 1.

| Group | $R_i$ (Ω) | $\rho\_R_i$ (Ω · cm) | $R_1$ (Ω) | $\rho\_R_1$ (Ω · cm) | $R_3$ (Ω) | $\rho\_R_3$ (Ω · cm) |
|---|---|---|---|---|---|---|
| E1 | 0.1012 | 0.24 | 0.1320 | 0.31 | 0.1400 | 0.33 |
| E2 | 0.1371 | 0.32 | 0.1874 | 0.44 | 0.2057 | 0.48 |
| E3 | 0.1292 | 0.30 | 0.1749 | 0.41 | 0.1878 | 0.44 |
| C1 | 0.1334 | 0.18 | 0.2168 | 0.29 | 0.2437 | 0.32 |

In Table 4, the first row shows items to be tested from left to right.

"$R_i$" refers to initial electrical resistance of the PTC chip at room temperature.

"$R_1$" refers to the electrical resistance of the PTC chip after one cycle of the reflow treatment. The electrical resistance is measured when the PTC chip is cooled back to room temperature. The reflow treatment in each cycle is performed at temperature ranging from 140° C. to 290° C. for a duration of five minutes.

"$R_3$" refers to the electrical resistance of the PTC chip after three cycles of the reflow treatment. The electrical resistance is measured when the PTC chip is cooled back to room temperature.

Moreover, the electrical resistance formula is $\rho=R\times A/L$. "R" is electrical resistance, "L" is length (thickness), and "A" is cross sectional area. Accordingly, the electrical resistivities of $\rho\_R_i$, $\rho\_R_1$, and $\rho\_R_3$ can be calculated corresponding to $R_i$, $R_1$, and $R_3$, respectively.

$R_i$ of the embodiments E1 to E3 ranges from 0.1Ω to 0.14Ω, and $R_i$ of the comparative example C1 is 0.1334Ω. Regarding the initial electrical resistance (i.e., $R_i$), only the embodiment E1 has a lower value compared to the comparative example C1, and thus allows more current to flow through the over-current protection device before any trip event; and the embodiments E2 and E3 are not quite different from the comparative example C1. However, all the embodiments are obviously advantageous over the comparative example C1 after the reflow treatment. After the reflow treatment, both $R_1$ and $R_3$ of the embodiments E1 to E3 are much lower than that of the comparative example C1. More specifically, in the embodiments E1 to E3, $R_1$ ranges from 0.13Ω to 0.19Ω, and $R_3$ ranges from 0.14Ω to 0.21Ω. In the comparative example C1, $R_1$ is 0.2168Ω, and is higher than the above range of 0.13Ω-0.19Ω; and $R_3$ is 0.2437Ω, and is also higher than the above range of 0.14Ω-0.21Ω. From the above data, it reveals that the embodiments E1 to E3 are more thermally stable than the comparative example C1, and the electrical resistance of the over-current protection device 10 can return to a lower level as well.

TABLE 5

Thermal stability test 2.

| Group | $R_{175^\circ C.}\_4$ hr (Ω) | $\rho\_R_{175^\circ C.}\_4$ hr (Ω · cm) | $R_{175^\circ C.}\_4$ hr/$R_i$ | crack |
|---|---|---|---|---|
| E1 | 0.2346 | 0.55 | 2.318 | No |
| E2 | 0.3680 | 0.87 | 2.684 | No |
| E3 | 0.3111 | 0.73 | 2.408 | No |
| C1 | 0.4392 | 0.59 | 3.292 | Yes |

In Table 5, the first row shows items to be tested from left to right.

"$R_{175^\circ C.}\_4$ hr" refers to the electrical resistance of the PTC chip after the baking treatment. After baking at 175° C. for 4 hours, the electrical resistance of the PTC chip is measured when it is cooled back to room temperature. According to the aforementioned electrical resistance formula, the electrical resistivity of $\rho\_R_{175^\circ C.}\_4$ hr can be calculated corresponding to $R_{175^\circ C.}\_4$ hr.

"$R_{175^\circ C.}\_4$ hr/$R_i$" refers to the ratio between $R_{175^\circ C.}\_4$ hr and $R_i$. This ratio is also called resistance-jump ratio. The smaller the ratio is, the better the electrical resistance recovery capability of the PTC chip will be. This ratio can be an index for assessing whether the PTC chip recovers to its low electrical resistance state under room temperature.

In the embodiments E1 to E3, the electrical resistance after baking (i.e., $R_{175^\circ C.}\_4$ hr) recovers to about 0.23Ω to 0.37Ω. In contrast, $R_{175^\circ C.}\_4$ hr of the comparative example C1 is 0.4392Ω, which is much higher than the aforementioned range. After the baking treatment, the resistance-jump ratios can also be calculated. $R_{175^\circ C.}\_4$ hr/$R_i$ of the embodiments E1 to E3 ranges from 2.3 to 2.7, and $R_{175^\circ C.}\_4$ hr/$R_i$ of the comparative example C1 is 3.292. The resistance-jump ratios of the embodiments E1 to E3 are much lower than that of the comparative example C1, and it means that the resistance stability of the embodiments E1 to E3 is better under high temperature. After the baking treatment test (i.e., thermal stability test 2) comes to an end, all the PTC chips of the embodiments E1 to E3 and the comparative example C1 are further sliced and analyzed by SEM to observe inside structure of the heat-sensitive layer, and the specifics are shown in FIG. 3*a* and FIG. 3*b*.

Figure 3A:
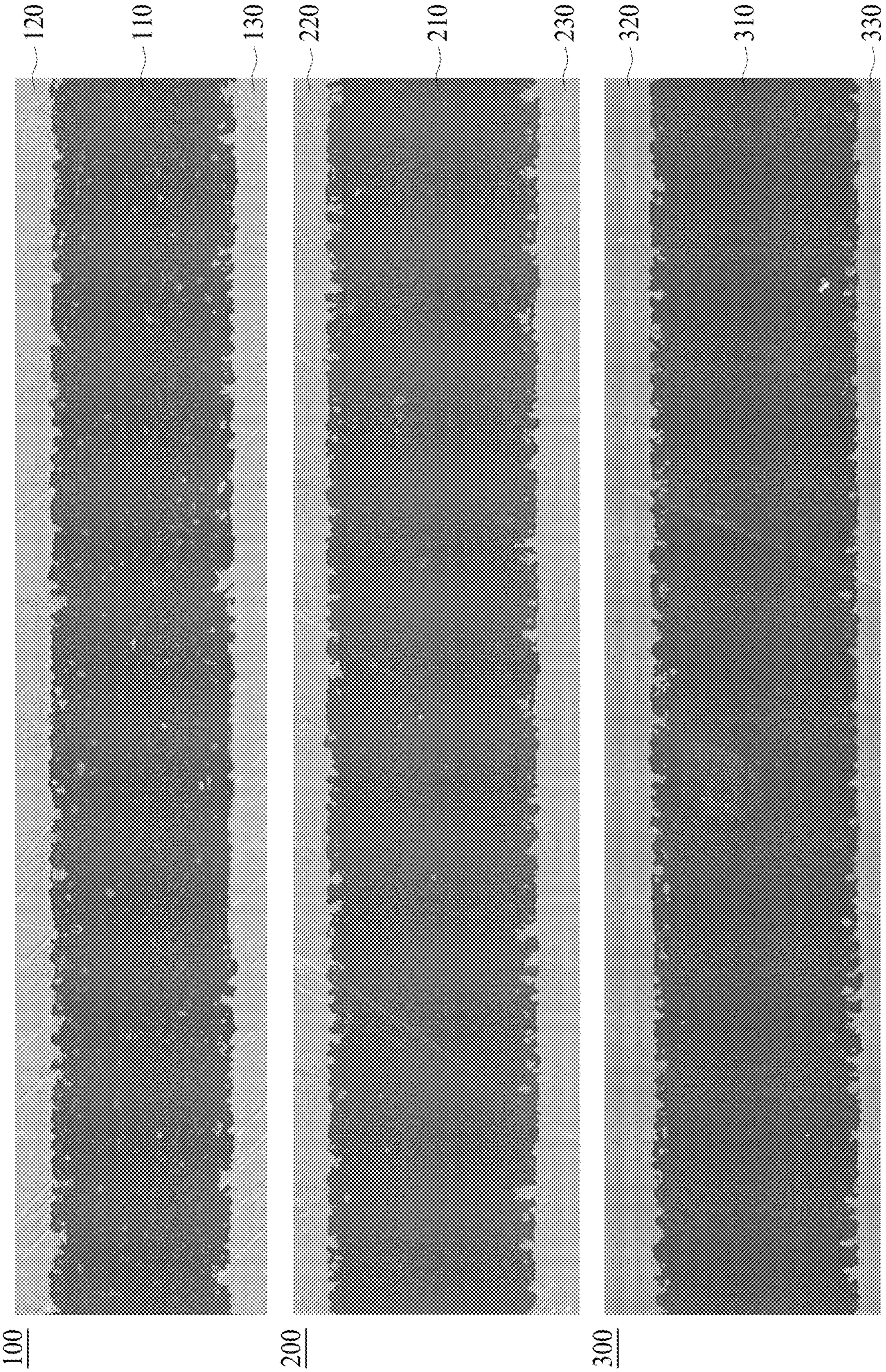
FIG. 3*a* shows cross-sectional views of the embodiments imaged by scanning electron microscopy (SEM)

FIG. 3*a* shows cross-sectional views of the embodiments E1 to E3 after the baking treatment, which correspond to cross-sectional views of an over-current protection device 100, an over-current protection device 200, and an over-current protection device 300. The over-current protection device 100, the over-current protection device 200, and the over-current protection device 300 have the same structure as the structure of the over-current protection device 10. Top metal layers 120, 220, 320 correspond to the top metal layer 12; bottom metal layers 130, 230, 330 correspond to the bottom metal layer 13; and heat-sensitive layers 110, 210, 310 correspond to the heat-sensitive layer 11. In FIG. 3*a*, after the baking treatment, no obvious gaps are found in the heat-sensitive layers 110, 210, 310 of the embodiments E1 to E3, not to mention cracks. The structures of the embodiments E1 to E3 remain substantially intact. As described above, the IPN structure and low CTE of the polymer matrix can maintain the integrity of the layer structure under high temperature.

Figure 3B:
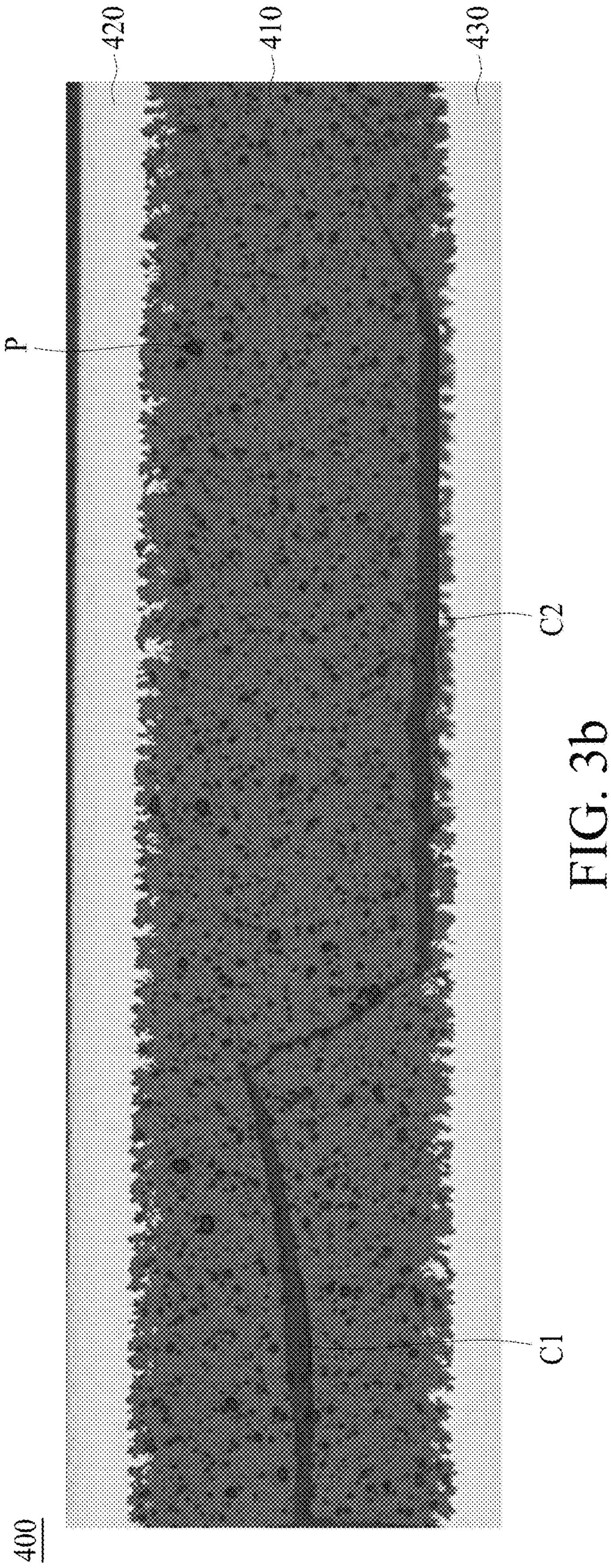
FIG. 3*b* shows a cross-sectional view of a comparative example imaged by SEM.

FIG. 3*b* shows a cross-sectional view of the comparative example C1 after the baking treatment, which corresponds to a cross-sectional view of an over-current protection device 400. A top metal layer 420, a bottom metal layer 430, and a heat-sensitive layer 410 correspond to the top metal layer 12, the bottom metal layer 13, and the heat-sensitive layer 11, respectively, and the details are not described herein. In comparison with the embodiments E1 to E3 in FIG. 3*a*, the comparative example C1 in FIG. 3*b* shows that under high temperature, the inside is expanded to form gaps P with various sizes in the heat-sensitive layer 410 of the over-current protection device 400. In certain regions, a crack C1 and a crack C2 are further formed due to severe expansion in the inside and at the interface. It is understood that the cracks (i.e., the cracks C1 and C2) cause the increase of electrical resistance, and the crack C2 at the interface may even lead to peeling of the bottom metal layer 430 from the heat-sensitive layer 410. Obviously, the issues of gaps, cracks, or even peeling of the heat-sensitive layer 410 of the comparative example C1 arise, and the integrity of the entire structure is worse.

Then, the voltage endurance capability of the present invention is also verified by the cycle life test, and the result is shown in Table 6.

TABLE 6

Cycle life test.

| | 20 V/10 A | | | 30 V/10 A |
|---|---|---|---|---|
| Group | 500 cycles | $R_{500\ C}/R_i$ | SD of $R_{500\ C}$ | 500 cycles |
| E1 | Pass | 3.32 | 3.34 | Pass |
| E2 | Pass | 4.60 | 8.53 | Pass |
| E3 | Pass | 3.08 | 7.64 | Pass |
| C1 | Pass | 5.92 | 10.217 | Fail |

The cycle life test is a test applying a specified power for 10 seconds and turning it off for 60 seconds (i.e., on: 10 seconds; off: 60 seconds) for each cycle, by which it can be observed whether the over-current protection device would be burnt out or not after a number of cycles, and the resistance change is also analyzed. As shown in Table 6, there are two applied powers, one is 20V/10 A and the other one is 30V/10 A, both of which are applied for 500 cycles. "Pass" means that the over-current protection device is not burnt out, and "Fail" means that the over-current protection device is burnt out. After being applied at 20V/10 A, the embodiments and the comparative example are not burnt out, and the resistance change of them can be analyzed. After being applied at 30V/10 A, the comparative example C1 is the only one which is burnt out, and it means that the embodiments E1 to E3 have a higher maximum of the voltage-endurance value.

Under the test condition of 20V/10 A, an electrical resistance (i.e., $R_{500\ C}$) is measured when the PTC chip is cooled back to room temperature after the cycle life test. $R_{500\ C}/R_i$ is a resistance-jump ratio after the cycle life test. Likewise, the smaller the ratio is, the better the electrical resistance recovery capability of the PTC chip will be. This ratio can be an index for assessing whether the PTC chip recovers to its low electrical resistance state under room temperature. $R_{500\ C}/R_i$ of the embodiments E1 to E3 ranges from 3 to 4.6, and $R_{500\ C}/R_i$ of the comparative example C1 is 5.92. Accordingly, the resistance-jump ratios of the embodiments E1 to E3 are much lower than that of the comparative example C1, and it suggests that after cycles of voltage-current shock, the resistance stability of the embodiments E1 to E3 is better than that of the comparative example C1. In addition, in order to verify consistency during mass production of the over-current protection device of the present invention, standard deviation (SD) of $R_{500\ C}$ is further calculated according to the following SD formula:

$$S = \sqrt{\frac{\sum (x_i - \bar{x})^2}{n}}$$

"S" stands for standard deviation. "n" is the total number of samples. As described above, fifteen PTC chips are tested in each group, and thus n is 15. "$x_i$" is individual value in respect of $R_{500\ C}$ of each PTC chip. "$\bar{x}$" is the mean of all values of $R_{500\ C}$ of 15 PTC chips. In Table 6, SD of $R_{500\ C}$ of the embodiments E1 to E3 ranges from 3.3 to 8.5, and any value in this range is much lower than 10.217, which is SD of $R_{500\ C}$ of the comparative example C1. The above data shows that, in each group of E1-E3, the resistance change and/or variation between 15 over-current protection devices is small after the cycle life test. In other words, according to the present invention, the electrical resistances of the over-current protection devices are more consistent with each other during mass production.

The above tests mainly focus on the thin and small size heat-sensitive layer 11, the size of which is 0.099 mm×2 mm×2 mm. However, in some cases, the chip (i.e., the over-current protection device) may be made larger in order to satisfy the customized specifications. For example, the chip for automotive applications is often larger than the chip used in small apparatuses (e.g., cell phone), and the reason lies in that the chip for automotive applications needs to be assembled on a fixture instead of being directly welded on a circuit board. However, the fixture has a standard size and is a commonly used standard component in the industry, and therefore its design cannot be arbitrarily changed (i.e., reduced). In this case, the chip cannot match the fixture if its size is reduced too much. Therefore, the size of the heat-sensitive layer 11 is adjusted to be larger in the following test in order to verify that the present invention is applicable to different device specifications. That is, the present invention is applicable to not only small-sized devices but also large-sized devices.

On the basis of the same composition and the same manufacturing method described above, the size of the heat-sensitive layer 11 is adjusted in the following test. The length and width are 7.3 mm and 9.5 mm, respectively, and the thickness is 0.92 mm. That is, in the embodiments and the comparative example, the size of the heat-sensitive layer 11 is 0.92 mm×7.3 mm×9.5 mm. Also, fifteen samples are tested for each group.

TABLE 7

Electrical characteristics of different device specification.

| Group | $R_i$ (Ω) | ρ_$R_i$ (Ω · cm) | $R_1$ (Ω) | ρ_$R_1$ (Ω · cm) | $R_1/R_i$ |
|---|---|---|---|---|---|
| E1 | 0.0549 | 0.412 | 0.0685 | 0.514 | 1.25 |
| E2 | 0.0555 | 0.417 | 0.0782 | 0.587 | 1.41 |
| E3 | 0.0615 | 0.462 | 0.0781 | 0.586 | 1.27 |
| C1 | 0.05987 | 0.449 | 0.1398 | 1.049 | 2.34 |

In Table 7, the first row shows items to be tested from left to right.

"$R_i$" refers to initial electrical resistance of the PTC chip at room temperature.

"$R_1$" refers to the electrical resistance of the PTC chip after the first trip event. After the first trip event, the electrical resistance is measured when the PTC chip is cooled back under room temperature for 30 minutes. The first trip event includes applying voltage/current of 16V/50 A to the PTC chip for 3 minutes.

Moreover, the electrical resistance formula is $\rho=R\times A/L$. "R" is electrical resistance, "L" is length (thickness), and "A" is cross sectional area. Accordingly, the electrical resistivities of $\rho\_R_i$ and $\rho\_R_1$ can be calculated corresponding to $R_i$ and $R_1$, respectively.

"$R_1/R_i$" refers to the ratio between $R_1$ and $R_i$. This ratio is called resistance-jump ratio as previous defined. The smaller the ratio is, the better the electrical resistance recovery capability of the PTC chip will be. This ratio can be an index for assessing whether the PTC chip recovers to its low electrical resistance state under room temperature.

$R_i$ of the embodiments E1 to E3 ranges from 0.054Ω to 0.062Ω, and $R_i$ of the comparative example C1 is 0.05987Ω. Regarding the initial electrical resistance (i.e., $R_i$), the embodiments are not quite different from the comparative example C1. However, all the embodiments are obviously advantageous over the comparative example C1 after the first trip event. After the first trip event, $R_1$ of the embodiments E1 to E3 is much lower than that of the comparative example C1. More specifically, $R_1$ of the embodiments E1 to E3 ranges from 0.068Ω to 0.079Ω, and $R_1$ of the comparative example C1 is 0.1398Ω. The data of $R_i$ and $R_1$ can be further calculated to give the value of resistance-jump ratio. $R_1/R_i$ of the embodiments E1 to E3 ranges from about 1.2 to 1.4, and $R_1/R_i$ of the comparative example C1 is 2.34. In other words, after the first trip event, resistance change in the comparative example is larger than that in the embodiments, and can be approximately twice larger at most. From the above, the embodiments E1 to E3 have a better thermal stability under high temperature, by which the electrical resistance of the over-current protection device can return to a lower level.

In conclusion, the present invention introduces the polyolefin-based copolymer into the polymer matrix. When the polymer matrix of the heat-sensitive layer includes the polyolefin-based copolymer, CTE can be largely reduced. Moreover, if the polyolefin-based homopolymer is further added to make the polymer matrix include both the polyolefin-based copolymer and the polyolefin-based homopolymer, the structure of IPN can be formed, by which the entire structure of the device is much stable. In this way, the over-current protection device can be made thinner, and can operate at a higher applied voltage without burnout.

The above-described embodiments of the present invention are intended to be illustrative only. Numerous alternative embodiments may be devised by persons skilled in the art without departing from the scope of the following claims.

What is claimed is:

1. An over-current protection device, comprising:

a heat-sensitive layer having a top surface and a bottom surface; and an electrode layer comprising a top metal layer and a bottom metal layer, wherein the top metal layer and the bottom metal layer are attached to the top surface and the bottom surface of the heat-sensitive layer, respectively;

wherein the heat-sensitive layer exhibits a positive temperature coefficient (PTC) characteristic and comprises:

a polymer matrix comprising:

a polyolefin-based homopolymer having a first coefficient of thermal expansion (CTE); and a polyolefin-based copolymer having a second CTE, wherein the second CTE is lower than the first CTE, and the polyolefin-based homopolymer and the polyolefin-based copolymer together form an interpenetrating polymer network (IPN), wherein the polyolefin-based copolymer is ethylene-butene copolymer, wherein the total volume of the heat-sensitive layer is calculated as 100%, and the polymer matrix accounts for 47% to 52%; and a conductive filler dispersed in the polymer matrix, thereby forming an electrically conductive path in the heat-sensitive layer.

2. The over-current protection device of claim 1, wherein the polyolefin-based homopolymer is high-density polyethylene, and the polyolefin-based copolymer is selected from the group consisting of ethylene-butene copolymer, ethylene-pentene copolymer, ethylene-hexene copolymer, ethylene-heptene copolymer, and ethylene-octene copolymer.

3. The over-current protection device of claim 2, wherein the polyolefin-based copolymer is a random copolymer, a graft copolymer, or combination thereof according to an arrangement of monomer units.

4. The over-current protection device of claim 1, wherein a volume-to-volume ratio of the polyolefin-based homopolymer to the polyolefin-based copolymer is 1:4 to 4:1.

5. The over-current protection device of claim 4, wherein a CTE of the heat-sensitive layer ranges from 42 ppm/° C. to 60 ppm/° C. between 20° C. and 100° C.

6. The over-current protection device of claim 5, wherein a CTE of the heat-sensitive layer ranges from 1500 ppm/° C. to 2600 ppm/° C. between 100° C. and 120° C.

7. The over-current protection device of claim 6, wherein a CTE of the heat-sensitive layer ranges from 180 ppm/° C. to 240 ppm/° C. between 150° C. and 175° C.

8. The over-current protection device of claim 7, wherein the conductive filler consists of carbon black, wherein the total volume of the heat-sensitive layer is calculated as 100%, and the conductive filler accounts for 33% to 39%.

9. The over-current protection device of claim 1, wherein the heat-sensitive layer further comprises a flame retardant, wherein the flame retardant is selected from the group consisting of zinc oxide, antimony oxide, aluminum oxide, silicon oxide, calcium carbonate, magnesium sulfate, barium sulfate, magnesium hydroxide, aluminum hydroxide, calcium hydroxide, barium hydroxide, and any combination thereof.

10. The over-current protection device of claim 1, wherein the heat-sensitive layer has a thickness ranging from 0.09 mm to 0.13 mm.

11. The over-current protection device of claim 10, wherein the over-current protection device has a first resistance-jump ratio ranging from 2.3 to 2.7, wherein the over-current protection device has a first electrical resistance in an initial state at room temperature before any trip event, and the over-current protection device has a second electrical resistance when cooled back to room temperature after baking at 175° C. for 4 hours, wherein a value by dividing the second electrical resistance by the first electrical resistance is the first resistance-jump ratio.

12. The over-current protection device of claim 11, wherein the first resistance-jump ratio ranges from 2.3 to 2.4.

13. The over-current protection device of claim 11, wherein the over-current protection device has a second resistance-jump ratio ranging from 3 to 5, wherein the over-current protection device has a third electrical resistance when cooled back to room temperature after being applied at 20V/10 A for 500 cycles, and a value by dividing the third electrical resistance by the first electrical resistance is the second resistance-jump ratio.

14. The over-current protection device of claim 13, wherein the second resistance-jump ratio ranges from 3.3 to 3.4.

15. The over-current protection device of claim 13, wherein the over-current protection device has a voltage-endurance value of at least 30V, and the over-current protection device is not burnt out after being applied at 30V/10 A for 500 cycles.

16. The over-current protection device of claim 13, wherein a standard deviation of the third electrical resistance ranges from 3.3 to 8.6.

17. The over-current protection device of claim 16, wherein the standard deviation of the third electrical resistance ranges from 3.3 to 3.4.

18. The over-current protection device of claim 1, wherein the heat-sensitive layer has a thickness ranging from 0.9 mm to 0.94 mm.

19. The over-current protection device of claim 18, wherein the over-current protection device has a top-view area ranging from 64 $mm^2$ to 74 $mm^2$.

20. The over-current protection device of claim 19, wherein the over-current protection device has a third resistance-jump ratio ranging from 1.2 to 1.5, wherein the over-current protection device has a first electrical resistance in an initial state at room temperature before any trip event, and the over-current protection device has a fourth electrical resistance when cooled back to room temperature after being applied at 16V/50 A for 3 minutes, wherein a value by dividing the fourth electrical resistance by the first electrical resistance is the third resistance-jump ratio.

* * * * *